United States Patent [19]

Zerrer et al.

[11] 4,285,127
[45] Aug. 25, 1981

[54] APPARATUS FOR TRIMMING PLANTS

[75] Inventors: Gerhard Zerrer, Korb; Roland Beier, Esslingen, both of Fed. Rep. of Germany

[73] Assignee: Andreas Stihl, Waiblingen, Fed. Rep. of Germany

[21] Appl. No.: 52,910

[22] Filed: Jun. 28, 1979

[30] Foreign Application Priority Data

Jun. 28, 1978 [DE] Fed. Rep. of Germany ....... 2828425

[51] Int. Cl.³ .......................................... A01D 50/00
[52] U.S. Cl. ...................................... 30/276; 56/12.7
[58] Field of Search .................... 30/276, 347; 56/12.7

[56] References Cited

U.S. PATENT DOCUMENTS 4,104,796  8/1978  Sheldon .................................. 30/276

Primary Examiner—Jimmy C. Peters
Attorney, Agent, or Firm—Becker & Becker, Inc.

[57] ABSTRACT

Apparatus for trimming plants, which apparatus includes at least one handle and a rotating, powered trimming head, which trimming head includes at least one flexible, filament-type trimming element, especially a synthetic or plastic filament or thread end-section, extending beyond the periphery of the housing for the trimming head, which trimming element is wound on a spool provided in the housing. The end-section can be adjusted by a predetermined amount during operation of the apparatus by the intervention of a coupling element whereby the spool is rotated relative to the housing through a predetermined angle, with the coupling element being movable from a lock position to a release position by means of centrifugal forces.

25 Claims, 4 Drawing Figures

APPARATUS FOR TRIMMING PLANTS

The present invention relates to an apparatus for trimming plants.

The trimming element of an apparatus of this type becomes relatively rapidly worn due to the required high number of revolutions thereof. It will then be necessary to adjust the length of the trimming element by unwinding the predetermined length from a storage spool. For this, the apparatus is pushed, during operation, in approximately vertical position against the ground, whereby the spool is moved in axial direction, and the pertaining clutch is released. Due to the rotational impulses acting thereon, the storage spool, simultaneously, is moved to a second abutment position, whereby the trimming element is unwound from the storage spool by the required adjustment length. It is of detriment herein, that the adjustment is not fully automatic but has to be initiated by the operating person who, of necessity, then has to control very frequently the length of the trimming element or trimming filament. For such a control, however, the operating person will have difficulty in estimating the actual length of the trimming filament with the required accuracy for the desired high degree of efficiency of the apparatus. Furthermore, the effort of force required to trigger the coupling will be dependent on the conditions of the ground that is worked on, so that more or less effort or force is required to release the coupling. Thus, when trying to apply the proper amount of effort or the required force, or, when the operating person has estimated the length of the trimming filament for too short an amount, it can occur that the apparatus has to be pressed against ground several times, or too often, so that the trimming filament which is unwound is of excessive length. When the length of the trimming filament is excessive, the motor powering the apparatus is easily overloaded leading to damage or even destruction thereof. Accordingly, the length of the trimming filament has to be adjusted by cutting off the excessive amount. For this, separate cutting devices have been suggested which are attached to the trimming apparatus. However, such cutting devices lead to an increase in the cost of the trimming apparatus and, primarily to an excessive consumption of the relatively expensive cutting filament.

It is an object of the present invention to provide an apparatus for trimming plants in which the adjustment of the trimming element by a predetermined, accurately definable amount can automatically be controlled without the intervention by the person operating the apparatus.

This object and other objects and advantages of the invention will appear more clearly from the following specification in connection with the accompanying drawings, in which.

Figure 1:
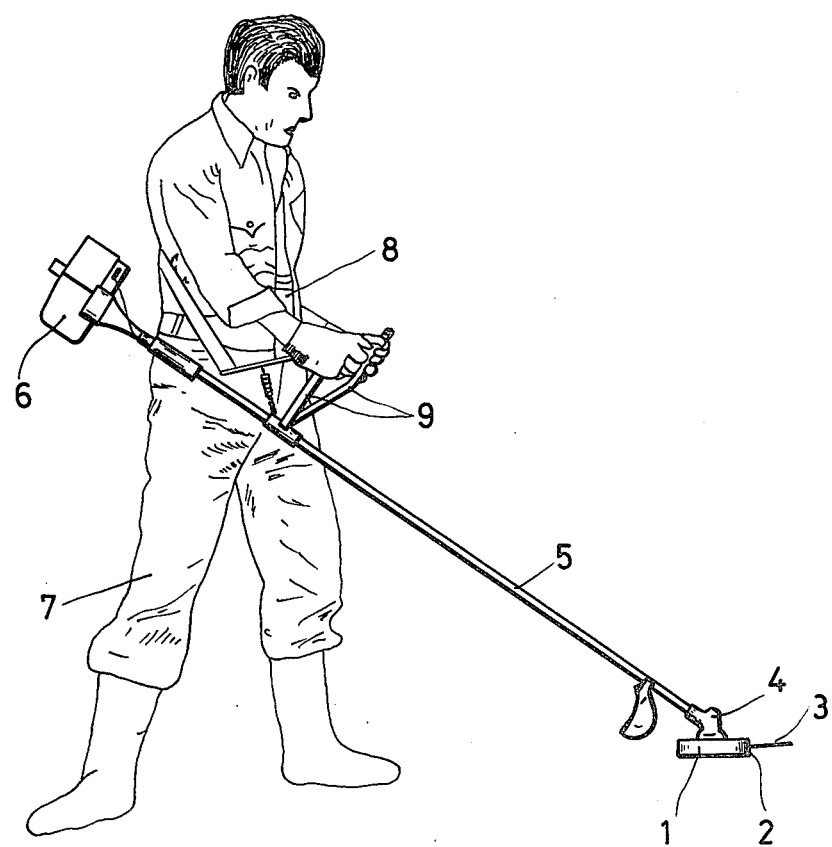
FIG. 1 is a perspective view showing the trimming apparatus in accordance with one embodiment of the invention being held by an operating person in the working position.

The invention is characterized primarily thereby that the coupling element is movable from its lock position to its release position by means of centrifugal forces.

In accordance with a preferred embodiment the coupling element comprises one, however, preferably at least a first lock member and a second lock member which, when the coupling element is in the first and the second lock position, are in contact with the pertaining lock-counter member, preferably at a cam-like projection provided on the circumference of the pertaining storage spool.

In accordance with yet another embodiment of the invention, the coupling element is mounted so as to be movable by the intervention of centrifugal forces.

In accordance with another embodiment of the invention, the first and the second lock members are generally parallel to each other and, in the direction of rotation of the trimming head, are positioned at a distance from each other.

In accordance with yet another preferred embodiment, the coupling element is provided by a member, preferably a U-shaped member having legs of dissimilar lengths.

In accordance with another embodiment of the invention, the first lock member is provided by the end of the shorter leg of the U-shaped member, the end being bent at right angles, which end can be brought into contact with one of several inwardly directed lock-counter members arranged on the annular flange of the pertaining storage spool.

In accordance with yet another embodiment of the invention, the second lock member is provided by the end of the longer leg of the U-shaped member, this end also being bent angularly at right angles and being adapted to operatively contact or engage one of preferably several approximately radially outwardly directed lock-counter members projecting from the annular flange of the storage spool.

In accordance with another embodiment, the first lock member is held in the first lock position of the coupling element by the intervention of a resiliently biasing means, in which first locking position of the coupling element the trimming filament is essentially of its original, or unconsumed length, and for radial shifting of the coupling element relative to the storage spool and the housing to assume its second lock position, in which the second lock member is operatively connectable to the storage spool, the centrifugal force acting on the coupling element and the resiliently biasing means is greater than the pertaining force of the resiliently biasing means, preferably a spring.

In accordance with yet another preferred embodiment, the spring extends transverse, preferably vertical to the lock members and is preferably in the form of a rod having ends which are operatively connected in pertaining bearing means provided in the bottom of the trimming housing.

In accordance with another embodiment of the invention, the spring is locatable between two radially extending, relative to the storage spool, adjacent abutments which are preferably unitary with the bottom of the trimming housing, and that in the abutment position of the spring at the radially outwardly abutment the second lock member is positioned in the path of movement of one of the radially outwardly projecting lock-counter members.

In accordance with a preferred embodiment of the invention a coupling element is locatable at the radially inwardly abutment of the bottom of the trimming housing and the spring, when in its first lock position, by the intervention of a tip of a generally V-shaped, radially outwardly extending section.

In accordance with yet another embodiment of the invention, the legs of the U-shaped member are supportable by several guide members. Preferably, the shorter leg of the U-shaped member is supported by two, and the longer leg is preferably supported by three guide members. The guide members are positioned with radial spacing next to each other so that at least two are positioned on a common axis, which axis crosses each leg of a U-shaped member, and the guide members are preferably provided at the bottom of the trimming housing, for example, by cam-like projections, or the like.

In accordance with yet another preferred embodiment, the width measured in the direction of rotation of the trimming head of the outwardly projecting lock-counter members, preferably their width and the thickness of the lock members is maintained low relative to the distance of neighboring, outwardly projecting lock-counter members.

In accordance with another preferred embodiment of the invention, the inwardly directed lock-counter members, in the direction of rotation of the trimming head 1, are positioned, approximately at the same height, preferably immediately following the outwardly projecting lock-counter members, at the annular flange of the storage spool.

Referring now particularly to the drawings, as indicated in FIG. 1, the embodiment shown therein of the trimming apparatus comprises a trimming head 1 with a trimming element or filament 3 which projects radially outwardly during its use from the trimming head housing 2. Furthermore, the apparatus comprises a carrying member 5, e.g. a tube, which carries at its lower end, by the intervention of a connecting piece 4, the trimming head 1 and which carries at its upper end the motor 6 which serves to power the trimming head 1. The trimming apparatus is provided with handles 9 and a shoulder belt 8, which shoulder belt 8 can be worn by the operator 7 to carry and move about the trimming apparatus. The motor 6 is connected, by the intervention of a power shaft, not shown, arranged in the carrying member 5 with a transmission, not shown, arranged at the connecting piece 4 with the trimming head 1. The connecting piece 4 extends through a central opening 33 (FIG. 2) in the bottom 20 of the cup-like housing of the trimming head 1, which housing can be closed by cover 13. At the bottom 20 of housing 2 there is provided a guide ring 19 which is arranged to be coaxial with the central opening 33. The guide ring serves to locate the spool or storage spool, generally designated by the numeral 10, on which there is wound a flexible, preferably nylon-type filament or thread 11, the free end of which extends by a predetermined length through a guide end 12 out of the housing 2. This trimming element or filament end, generally designated by the numeral 3, during rotation of the trimming head 1 provides for a trimming or severing or cutting element with which plants, such as grass, weeds or the like, or even small branches or the like can be positively trimmed to the desired length. Depending on the output of the motor and the resistance to trimming, the trimming end 3 can be longer or shorter.

Figure 2:
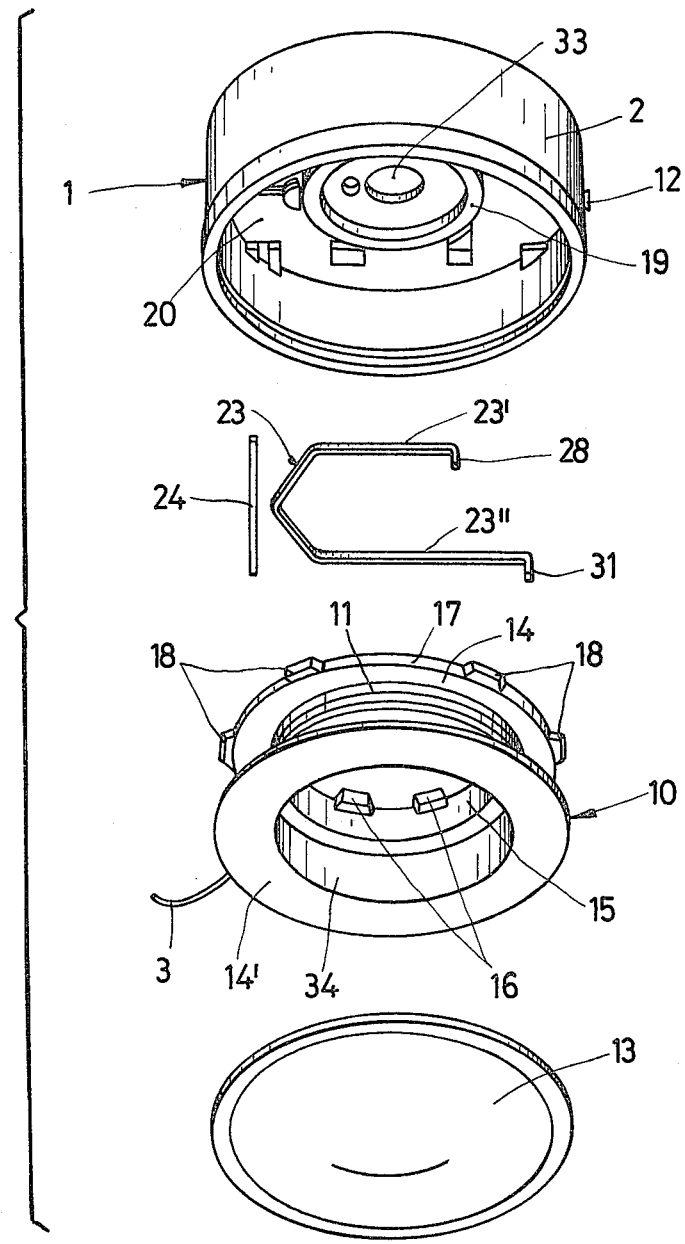
FIG. 2 is an exploded view showing the components of the trimming head of the apparatus in accordance with FIG. 1.

The spool 10 comprises a central hub portion 34 and radially outwardly extending therefrom a pair of generally parallel annular flanges, with an upper flange 14 and a lower flange 14' (FIG. 2). The two flanges are of different outer diameter whereby the wider annular flange 14' has a diameter which approximately corresponds to the outer diameter of the trimming housing 2 and in the assembled position is located opposite the cover 13. Along the periphery 17 of the annular flange 14 having a smaller diameter there are arranged several cam-like projections 18 which serve as lock-counter members in the assembly. The cam-like projections 18 are radially spaced in uniform distribution and project radially outwardly with, in plan view, trapezoidal outline. On the inner wall 15 of the hub portion 34 of spool 10 there are provided radially inwardly projecting cam-like projections 16 which also act as lock-counter members. These cam-like projections 16 are also evenly distributed about the inner diameter of the spool and in conformity with the spacing of the cam-like projections 18. The projections 16 are arranged at the same level one behind the other and with each being approximately step-like with a triangular outline. These projections 16 are located in the direction of rotation, designed by the numeral 38 (FIGS. 3 and 4) of the trimming head 1, preferably immediately behind the corresponding outer projections 18. A first lock member 28 is associated with the inner projections 16, while a second lock member 31 is associated with the outer projections 18. The lock members 28 and 31 are provided by the ends of a U-shaped member 23 which member serves as the coupling element for the trimming apparatus, with the pertaining ends being bent at right angles and in the same direction. This member 23 is preferably formed of spring wire and is locatable between the annular flange 14 of spool 10 and the bottom 20 of housing 2 so as to be radially shiftable relative to the storage spool 10.

Figure 3:
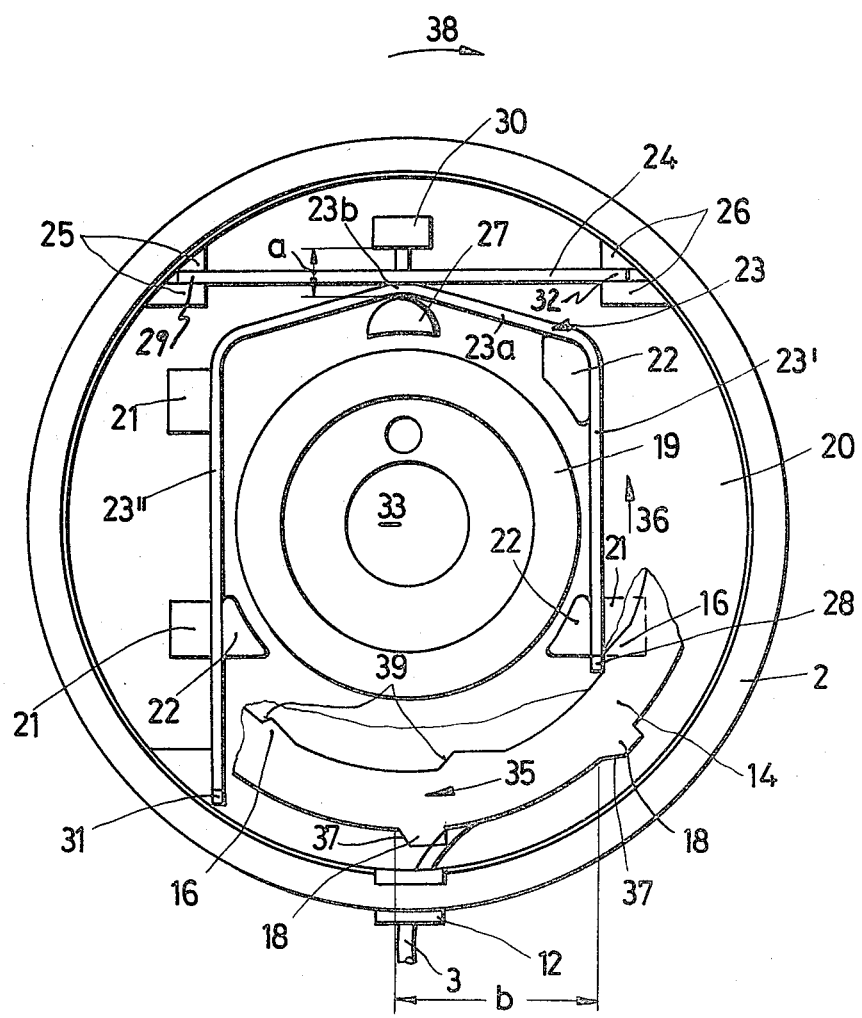
FIG. 3 is a bottom plan view of the trimming head with the cover of the housing removed and showing a first lock position of the coupling element, with the trimming element still having a sufficient length.
Figure 4:
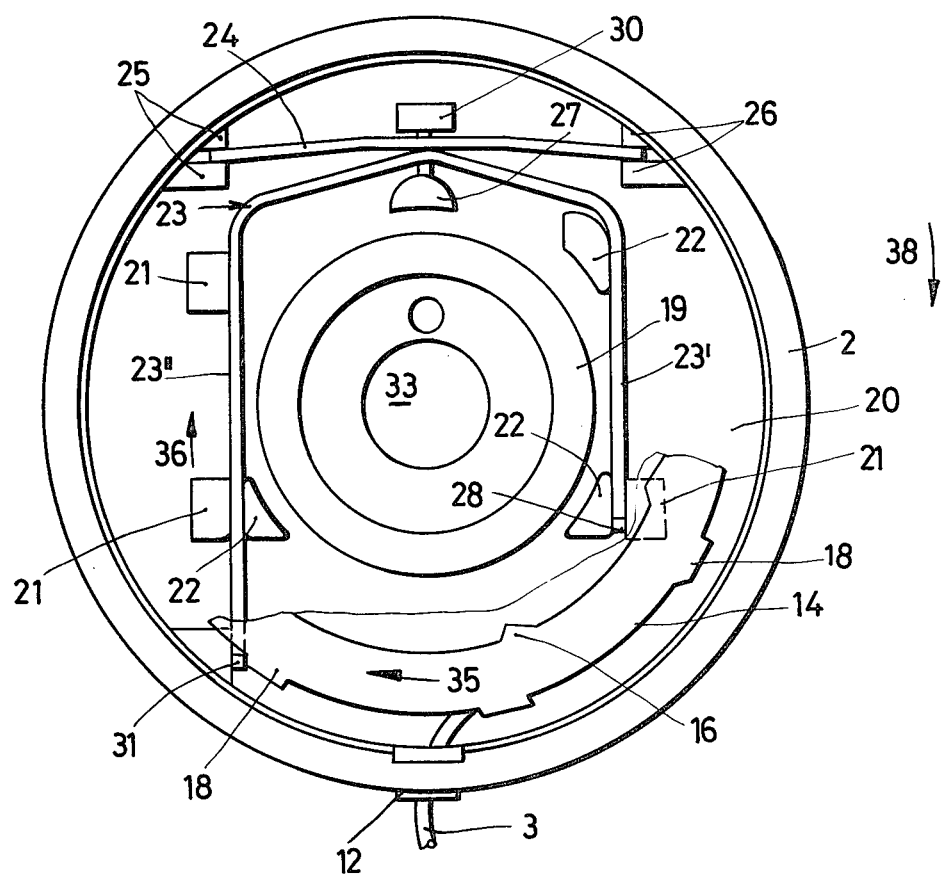
FIG. 4 is a view similar to FIG. 3, however, showing the coupling element in a second lock position, immediately after unwinding of a predetermined length of the trimming filament.

The lock members 28 and 31 can also be provided by a member which is of different configuration than member 23; they can be in two parts, for example by a, respectively, pivotally mountable single- or double-arm lever. Thus, the lock members 28 and 31 need only be responsive to the centrifugal force which increases as the wear shortens the trimming end 3, and need to be movable in a way that the first lock member 28 is disengaged from the pertaining inner projection 16 or lock-counter member, so that the spool 10 can rotate, under the effect of the acting centrifugal force, particularly of the cutting end 3, in the direction indicated by arrow 35 (FIGS. 3 and 4). Particularly, the spool 10 can be rotated until the second lock member 31 is positioned at the level of the outer projections 18 and until a forward, in the direction of rotation, outer projection is in contact therewith.

The member 23 is asymmetrical and comprises a shorter leg 23' and a longer leg 23''. The legs are combined by way of a V-like cross member 23a embracing an obtuse angle the apex of which, designated by the numeral 23b, points to the outside. Due to the asymmetrical formation of the member 23, its center of mass is not on the axis of rotation of the trimming head 1, and even not then when it is arranged in housing 2 in a way that its longitudinal central plane passes through the axis of rotation of the trimming head 1. This will ensure that a centrifugal force acts on member 23 under the effect of which the member can move relative to the housing 2 and the spool 10.

To ensure a proper bearing position and accurate movements of the member 23, which are important for the adjustment of the length of the cutting element or filament 3, at the bottom 20 of the housing 2, which housing is preferably produced by die-casting, there are provided, and integral therewith, cams 21 and 22 (FIGS. 3 and 4). The longer leg 23" of member 23 is associated with two outer cams 21 and one inner cam 22, with the inner cam 22 being approximately at the same location, but suitably spaced apart from the pertaining outer cam 21. The shorter leg 23' is associated with two inner cams 22 and one outer cam 21 which are positioned to be close to the bent end of the leg 23' providing the lock member also designated by numeral 28. The outer cams 21 associated with the longer leg 23" of the member 23 are positioned near its pertaining end 31 also referred to as lock member 31 and the region adjacent the cross member 23a.

In its first lock position, caused by the first lock member 28, this being the end of the shorter leg 23' of member 23, the member 23 with its tip 23b of its cross member 23a is in contact with a semicircular cam 27 rounded correspondingly and being provided at the bottom 20 of the housing, while the tip 23b is forwardly in contact with a rod-like spring 24 located in the outer third of housing 2. This spring or spring rod 24 extends across the pertaining chord and is secured with its ends 29 and 32 in pertaining radially neighboring holding formations 25 and 26 of the bottom 20 of the trimming housing 2. As long as the trimming end 3 has its proper length, the spring rod 24 moves the member 23 with its first lock member 28 of the shorter leg 23', while pretensioning it against the forward, in the direction of rotation indicated by arrow 38 of the trimming head 1, end face 39 of one of the inner protrusions 16. On increasing wear and, thus, reduction in length of the trimming end 3, also its air resistance decreases and its cutting resistance, whereby the number of rotations prevailing in the apparatus increases. On member 23 and on the spring rod 24 there is then acting an increasingly higher centrifugal force which will rise, on increase of the wear, to a level so as to be greater than the pertaining reactive force of the spring rod 24. The member 23 can then move under the effect of the centrifugal force radially outwardly until it reaches a second abutment or locking position in which the tip 23 will cause bending of the spring 24 to such an extent until this is in contact with cam 30 which is opposite to cam 27. As soon as the member 23 is moving radially outwardly, the lock member 28 extending vertically to the second plane (FIGS. 3 and 4) of the shorter leg 23' disengages from the pertaining inner projection 16. The spool 10 is then free to rotate under the effect of the centrifugal force acting on the cutting end 3 in the direction indicated by arrow 35 until the forward projection 18, forward in the direction indicated by arrow 35, is in contact with the second lock member 31 of member 23 which moves simultaneously in the direction indicated by the arrow 36. The height indicated by "a" (FIG. 3) between the cams or abutments 27 and 30 which abutments or cams limit the movement in the direction indicated by arrow 36 of the member 23, is selected in a way that the second lock member 31, in the second lock position of member 23, is in the path of movement of the outer projections 18. The distance indicated by "b" in FIG. 3 between the projections 18 and/or 16 is providing for a control for adjustment of the length of the trimming end 3. Advantageously, the thickness of the legs 23 and 23" and, accordingly, the thickness of the lock members 28 and 31, as well as the width, measured in the direction of rotation of the trimming head 1 indicated by arrow 38, of the projections 16 and 18, particularly the width of the outer projection 18 is small in comparison to the distance "b".

In the second lock position of member 23, due to the increasing length of the cutting end 33, which has attained its initial length, the air resistance and the resistance to cutting increase. At the same time, the number of rotations of the motor will be lower, so that a smaller centrifugal force acts on the member 23 and spring 24, this being less than the force inherent in the spring 24, so that spring 24 moves the member 23 to its first locking or abutment position in the direction opposite to that indicated by arrow 36.

The sequences just described will be repeated when the trimming end has become worn off after a certain amount of usage to the extent that the centrifugal force acting on the member 23 and spring 24 is greater than the force inherent in the spring 24 acting on the member 23.

The member 23, of course, can be operatively positioned and secured by other elements than those described in the foregoing, i.e. elements 21 and 22, relative to the housing 2 of the apparatus.

Thus, the present invention is, of course, in no way restricted to the specific disclosure of the specification and drawings, but also encompasses any modifications within the scope of the appended claims.

What we claim is:

1. An apparatus for trimming plants, comprising:
   a trimming head and guide means therewith;
   means operatively connected to said trimming head for rotating same;
   a spool received in said trimming head, said spool containing for unwinding thereof a flexible thread-like trimming element, said trimming element being unwindable from said spool along said guide means so as to extend beyond said trimming head for providing an effective cutting length, said spool and said trimming element being adapted to be rotated along with said trimming head; and
   a coupling element arranged as an asymmetrical bracket member spaced as well as resiliently supported in said trimming head and operatively associated with said spool, said coupling element being movable by centrifugal force from a lock position in which said trimming element is prevented from being unwound from said spool to a release position in which said trimming element can be unwound by movement of said spool relative to said trimming head in response to wear of said trimming element to restore said effective cutting length;
   said coupling element including at least first and second lock members, and said spool including means pertaining to at least one of said lock members for effecting said lock position and said release position of said coupling element, with pertaining means being operatively engageable by said at least one lock member, said coupling element including a single coupling member having a first leg and a second leg longer than said first leg formed as a bracket with said first and second legs being substantially parallel to each other with an extension of each leg being one of said first and second lock members.

2. An apparatus for trimming plants, comprising:
a trimming head and guide means therewith;
means operatively connected to said trimming head for rotating same;
a spool received in said trimming head, said spool containing for unwinding thereof a flexible thread-like trimming element, said trimming element being unwindable from said spool along said guide means so as to extend beyond said trimming head for providing an effective cutting length, said spool and said trimming element being adapted to be rotated along with said trimming head; and
a coupling element arranged as an asymmetrical bracket member spaced as well as resiliently supported in said trimming head and operatively associated with said spool, said coupling element being movable by centrifugal force from a lock position in which said trimming element is prevented from being unwound from said spool to a release position in which said trimming element can be unwound by movement of said spool relative to said trimming head in response to wear of said trimming element to restore said effective cutting length;
said coupling element including a single coupling member having a first leg and a second leg longer than said first leg;
said trimming head including a housing with said guide means including a position for guiding said legs of said coupling member;
said guide means including two radially spaced apart guide abutments for guiding said first leg and includes three radially spaced apart guide abutments for guiding said second leg of said coupling member, with at least one of said abutments for said first leg being paired with at least one of said abutments for said second leg.

3. An apparatus according to claim 2, wherein said coupling element includes at least one lock member and wherein said spool includes means pertaining to said at least one lock member for effecting said lock position and said release position of said coupling element, with pertaining means being operatively engageable by said at least one lock member.

4. An apparatus according to claim 2, wherein said coupling element is supported to be movable in response to a predetermined centrifugal force.

5. An apparatus according to claim 2, wherein each of said paired abutments comprises two abutments spaced apart to provide a groove for a pertaining leg of said coupling member.

6. An apparatus according to claim 2, wherein said trimming head includes a housing having a bottom-forming wall and wherein said abutments are in the form of cams provided on said bottom-forming wall.

7. An apparatus according to claim 2, wherein said coupling element includes a first lock member formed by a right-angle bent portion of said first leg, and wherein said spool includes at least one radially inwardly projecting first lock-counter member engageable by said first lock member for effecting said lock position.

8. An apparatus according to claim 7, wherein said spool also includes at least one radially outwardly projecting second lock-counter member, with said radially inwardly projecting first lock-counter member being provided at approximately the same level on said spool as said at least one second lock-counter member.

9. An apparatus according to claim 8, wherein, in the direction of rotation of said trimming head, adjacent first and second lock-counter members are offset from one another.

10. An apparatus according to claim 2, wherein said coupling element includes a second lock member formed by a right-angle bent portion of said second leg, and wherein said spool includes at least one radially outwardly projecting second lock-counter member engageable by said second lock member for effecting said release position.

11. An apparatus according to claim 9, wherein said spool includes a plurality of radially outwardly projecting second lock-counter members, with the spacing between adjacent second lock-counter members being greater than the width of a pertaining second lock-counter member measured in the direction of rotation of said trimming head.

12. An apparatus according to claim 11, wherein the spacing between adjacent second lock-counter members is greater than the width of a pertaining second lock-counter member and the thickness of said legs of said coupling member.

13. An apparatus for trimming plants, comprising:
a trimming head and guide means therewith;
means operatively connected to said trimming head for rotating same;
a spool received in said trimming head, said spool containing for unwinding thereof a flexible thread-like trimming element, said trimming element being unwindable from said spool along said guide means so as to extend beyond said trimming head for providing an effective cutting length, said spool and said trimming element being adapted to be rotated along with said trimming head; and
a coupling element arranged as an asymmetrical bracket member spaced as well as resiliently supported in said trimming head and operatively associated with said spool, said coupling element being movable by centrifugal force from a lock position in which said trimming element is prevented from being unwound from said spool to a release position in which said trimming element can be unwound by movement of said spool relative to said trimming head in response to wear of said trimming element to restore said effective cutting length;
said coupling element including at least one lock member and
said spool including means pertaining to said at least one lock member for effecting said lock position and said release position of said coupling element, with pertaining means being operatively engageable by said at least one lock member,
said coupling element including a first lock member and a second lock member;
means for resiliently biasing said first lock member in said lock position of said coupling element, in which position said effective length is substantially unconsumed, said resiliently biasing means being adapted to exert a force which is less than the centrifugal force acting upon said coupling element and said resiliently biasing means to thereby radially move said coupling element, relative to said spool and said trimming head, to said release position, in which position said second lock member operatively engages pertaining means on said spool;

said resiliently biasing means extending transversely relative to said first and second lock members;

said trimming head includes a housing and holding means provided therewith, said resiliently biasing means including a rod-like spring, the pertaining ends of which are operatively retained in said holding means.

14. An apparatus according to claim 13, wherein said housing has a bottom-forming wall and said holding means are mounted therewith.

15. An apparatus according to claim 13, wherein said housing includes at least two adjacent abutments spaced apart in radial direction and wherein said resiliently biasing means is locatable between said at least two abutments, and wherein said coupling element is adapted to move said resiliently biasing means radially outwardly to be in contact with the pertaining radially outer abutment so that said second lock member is adapted to engage pertaining means on said spool.

16. An apparatus according to claim 15, wherein said housing has a bottom-forming wall and wherein said two adjacent abutments are unitary with said bottom-forming wall.

17. An apparatus according to claim 15, wherein said coupling element includes a generally V-shaped, radially outwardly projecting cross member for contacting the radially inner abutment when in said lock position so that said coupling element engages said resiliently biasing means.

18. An apparatus according to claim 13, wherein said means for effecting said lock position and said release position includes cam-like members.

19. An apparatus according to claim 13, wherein said coupling element includes a first lock member and a second lock member.

20. An apparatus according to claim 13, wherein said first and said second lock members are held and located so as to be spaced apart in the direction of rotation of said trimming head and are substantially parallel to one another.

21. An apparatus according to claim 13, wherein said coupling element includes a single coupling member having a first leg and a second leg longer than said first leg.

22. An apparatus according to claim 13, wherein said trimming head includes a housing with said guide means including a portion for guiding said legs of said coupling member.

23. An apparatus according to claim 19, and further comprising means for resiliently biasing said first lock member in said lock position of said coupling element, in which position said effective length is substantially unconsumed, said resiliently biasing means being adapted to exert a force which is less than the centrifugal force acting upon said coupling element and said resiliently biasing means to thereby radially move said coupling element, relative to said spool and said trimming head, to said release position, in which position said second lock member operatively engages pertaining means on said spool.

24. An apparatus according to claim 23, wherein said resiliently biasing means extends transversely relative to said first and second lock members.

25. An apparatus for trimming plants, comprising:
a trimming head and guide means therewith;
means operatively connected to said trimming head for rotating same;
a spool received in said trimming head, said spool containing for unwinding thereof a flexible thread-like trimming element, said trimming element being unwindable from said spool along said guide means so as to extend beyond said trimming head for providing an effective cutting length, said spool and said trimming element being adapted to be rotated along with said trimming head; and
a coupling element arranged as an asymmetrical bracket member spaced as well as resiliently supported in said trimming head and operatively associated with said spool, said coupling element being movable by centrifugal force from a lock position in which said trimming element is prevented from being unwound from said spool to a release position in which said trimming element can be unwound by movement of said spool relative to said trimming head in response to wear of said trimming element to restore said effective cutting length;
said coupling element including a single coupling member having a first leg and a second leg longer than said first leg;
said coupling element being a U-shaped bracket member.

* * * * *